(12) United States Patent
Kim et al.

(10) Patent No.: US 11,777,102 B2
(45) Date of Patent: Oct. 3, 2023

(54) CURRENT COLLECTOR FOR ELECTRODE

(71) Applicant: U&S ENERGY, INC., Cheonan-si (KR)

(72) Inventors: Kyung Joon Kim, Daejeon (KR); Seung Ho Choi, Daejeon (KR)

(73) Assignee: U&S ENERGY, INC., Cheonan-si (KR)

( * ) Notice: Subject to any disclaimer, the term of this patent is extended or adjusted under 35 U.S.C. 154(b) by 177 days.

(21) Appl. No.: 17/424,689

(22) PCT Filed: Jan. 29, 2020

(86) PCT No.: PCT/KR2020/001337
§ 371 (c)(1),
(2) Date: Jul. 21, 2021

(87) PCT Pub. No.: WO2020/159218
PCT Pub. Date: Aug. 6, 2020

(65) Prior Publication Data
US 2022/0093930 A1 Mar. 24, 2022

(30) Foreign Application Priority Data
Jan. 30, 2019 (KR) .................. 10-2019-0011674

(51) Int. Cl.
*H01M 4/66* (2006.01)
*H01M 50/531* (2021.01)
*H01M 50/581* (2021.01)

(52) U.S. Cl.
CPC ......... *H01M 4/661* (2013.01); *H01M 50/531* (2021.01); *H01M 50/581* (2021.01); *H01M 2200/103* (2013.01)

(58) Field of Classification Search
CPC .... H01M 4/661; H01M 4/667; H01M 50/531; H01M 50/581; H01M 2200/103; Y02E 60/10
See application file for complete search history.

(56) References Cited

U.S. PATENT DOCUMENTS

| 10,923,728 | B1 * | 2/2021 | Zeng ............... H01M 4/661 |
| 2016/0043405 | A1 * | 2/2016 | Miyatake ......... H01M 10/613 |
| | | | 429/233 |
| 2019/0081314 | A1 * | 3/2019 | Morin ............... H01M 50/44 |
| 2019/0173092 | A1 * | 6/2019 | Liang ............... H01M 4/662 |

FOREIGN PATENT DOCUMENTS

| CA | 3074487 A1 | 1/2019 |
| EP | 1067611 A1 | 1/2001 |
| JP | 11-067188 A | 3/1999 |
| JP | 11-283608 A | 10/1999 |
| JP | 2010-073500 A | 4/2010 |
| JP | 2017-016787 A | 1/2017 |
| KR | 10-1036070 B1 | 5/2011 |
| KR | 10-2015-0035205 A | 4/2015 |
| KR | 10-2015-0046946 A | 5/2015 |

* cited by examiner

*Primary Examiner* — Ula C Ruddock
(74) *Attorney, Agent, or Firm* — NKL Law; Jae Youn Kim

(57) ABSTRACT

A current collector for electrodes according to an embodiment of the present disclosure may include a polymer film, and a conductive material provided on at least one surface of upper and lower surfaces of the polymer film, wherein the conductive material may have a function of an electrochemical fuse or a function of blocking a short-circuit current.

14 Claims, 21 Drawing Sheets

| DIVISION | 0.6 um(7 pass) | 1.2 um(14 pass) | 1.8 um(21 pass) | 2.4 um(28 pass) |
|---|---|---|---|---|
| 0.2V (vs. Li/Li+) | > MΩ | > MΩ | > MΩ | > MΩ |
| 0.3V (vs. Li/Li+) | > 1 Ω | > 0.5 Ω | < 0.5 Ω | < 0.5 Ω |
| 0.5V (vs. Li/Li+) | < 0.5 Ω | < 0.5 Ω | < 0.5 Ω | < 0.5 Ω |

FIG. 5

CURRENT COLLECTOR FOR ELECTRODE

TECHNICAL FIELD

The present disclosure relates to a current collector for electrodes, and more particularly, to a current collector for a cathode that functions as an electrochemical fuse that prevents overheating of a battery during a short circuit or blocks a short-circuit current pass by plating aluminum metal on a polymer film.

BACKGROUND ART

As technology development and demand for mobile devices increase, a demand for secondary batteries as an energy source is rapidly increasing. Among such secondary batteries, a lithium secondary battery that has high energy density and operating potential and has a low self-discharge rate have been commercialized.

The lithium secondary battery is the first commercialized secondary battery, and uses lithium metal as an anode. However, since the lithium secondary battery has problems of cell volume expansion and gradual decrease in capacity and energy density due to lithium dendrites formed on a surface of a lithium metal anode, and have problems of a short circuit, reduced cycle life, and cell stability (explosion and ignition) due to continuous growth of dendrites, the production of the lithium secondary battery is stopped only a few years later after the lithium secondary battery is commercialized. Therefore, instead of using the lithium metal, carbon-based anodes that may be more stable and stably store lithium in an ion state in a lattice or an empty space have been used. Due to the use of the carbon-based anodes, the lithium secondary battery is being commercialized and popularized in earnest.

So far, the lithium secondary battery has mainly been made of carbon-based or non-carbon-based anode materials. Development of most anode materials is focused on carbon-based (graphite, hard carbon, soft carbon, etc.) and non-carbon-based (silicon, tin, titanium oxide, etc.) materials.

Meanwhile, in recent years, as a portable electronic device and an information communication device are miniaturized, the lithium secondary battery is greatly expected to be used as an ultra-small power system for driving the portable electronic device and the information communication device.

Moreover, in recent years, the development and research of polymer-based electronic devices and elements using advantages such as flexibility, low price, and ease of manufacture are being actively conducted. Therefore, in order for the lithium secondary batteries to be used in miniaturized devices, it is necessary to reduce the thickness or weight of the battery while maintaining the energy density or performance of the lithium secondary battery.

In addition, even if the thickness or weight of the lithium secondary battery is reduced, the safety of the lithium secondary battery needs to increase by blocking or destroying a current pass when a short circuit occurs.

The present applicant proposes the present disclosure in order to solve the above problems.

DISCLOSURE

Technical Problem

The present disclosure proposes to solve the above problems, and provides a current collector for electrodes that functions as a fuse when an internal short circuit or an external short circuit occurs while reducing a thickness or a weight compared to a current collector made of a metal foil to prevent an increase in temperature and increase stability of a battery.

Technical Solution

According to the present disclosure, a current collector for electrodes includes: a polymer film; and a conductive material provided on at least one surface of upper and lower surfaces of the polymer film, wherein the conductive material may have a function of an electrochemical fuse or a function of blocking a short-circuit current.

Further, according to the present disclosure, a current collector for electrodes includes: a polymer film; and a conductive material provided on at least one surface of upper and lower surfaces of the polymer film, wherein when a short circuit occurs, the conductive material may react with the electrolyte to be corroded or broken along a thickness direction over an entire thickness of the conductive material.

Further, according to the present disclosure, a current collector for electrodes includes: a polymer film; and a conductive material provided on at least one surface of upper and lower surfaces of the polymer film, wherein when a short circuit occurs, a potential may drop to an anode potential and the conductive material may be corroded or broken along a thickness direction over an entire thickness of the conductive material.

The conductive material may be made of aluminum.

The conductive material may be coated or applied at a thickness of 0.6 μm to 2.4 μm.

At least one metal piece may be provided on at least one surface of the upper and lower surfaces of the polymer film, and the conductive material may be provided on a surface of a metal piece.

The metal piece may be made of an aluminum foil or SUS 316L foil.

The current collector for electrodes may further include a lead tab joined or connected to the metal piece.

A current flow may be blocked by a plurality of pores present in the conductive material when a short circuit occurs.

A plurality of nano-sized pores may be formed in the conductive material coated or applied to a surface of the polymer film, and when an internal short circuit or an external short circuit occurs, the conductive material may be corroded or broken over the entire thickness direction while a reaction area between an electrolyte and the conductive material present in the plurality of pores is widened to block a flow of a short-circuit current.

The current collector for electrodes may be for a cathode.

Advantageous Effects

In a current collector for electrodes according to the present disclosure, a polymer film is made of an insulator instead of a metal foil, a conductive material is coated on a surface of the polymer film, and a plating layer is formed on the surface of the polymer film, so a thickness of the current collector for electrodes according to the present disclosure may be further reduced than that of the current collector made of the metal foil.

A current collector for electrodes according to the present disclosure has a resistance value greater than a resistance of a current collector made of a metal foil when an internal short circuit or an external short circuit occurs, and a current flow may be disturbed due to a corrosion of a conductive material formed on a surface of the polymer film, so it is possible to reduce a short-circuit current when a short circuit occurs and to prevent a temperature of a battery from rising, thereby improving the safety of the battery.

The current collector for electrodes according to the present disclosure may increase safety while increasing an energy density of a secondary battery and secure the safety of a battery when a short circuit occurs.

DESCRIPTION OF DRAWINGS

FIG. 5 is a photograph illustrating a change in a state of a conductive material during a short circuit depending on a thickness of the conductive material in the current collector for electrodes according to the embodiment of the present disclosure.

BEST MODE

Figure 1:
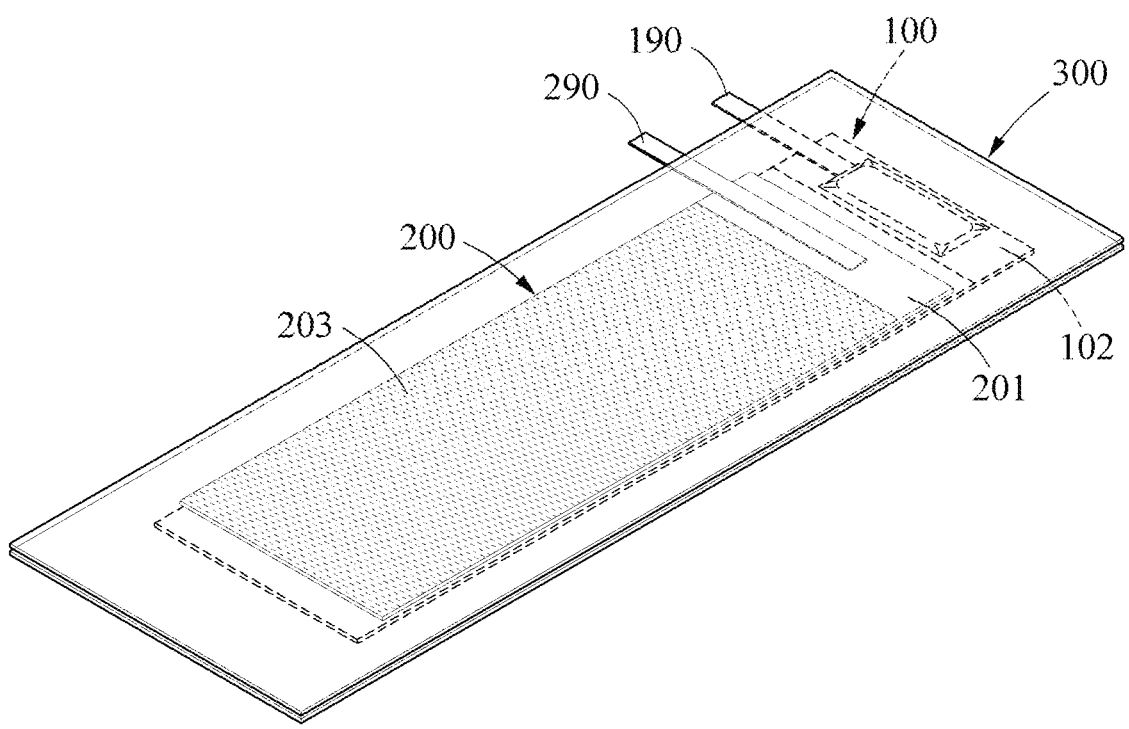
FIG. 1 is a perspective view illustrating an electrode assembly including a current collector for electrodes according to an embodiment of the present disclosure.

Hereinafter, embodiments of the present disclosure will be described in detail with reference to the accompanying drawings. However, the present disclosure is not limited or restricted to the embodiments. Like reference numerals proposed in each drawing denote like components.

Figure 2:
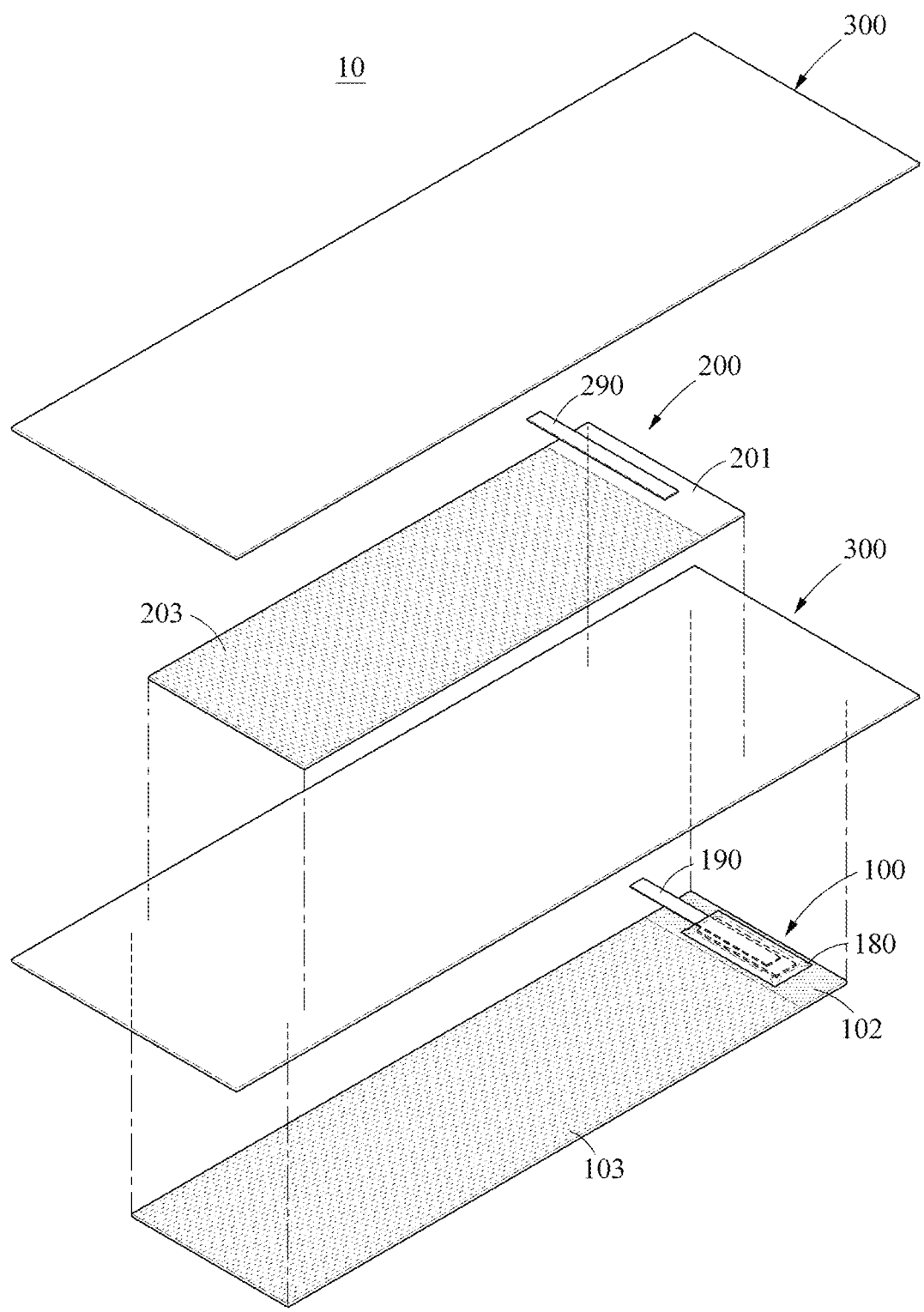
FIG. 2 is an exploded perspective view illustrating the electrode assembly according to the embodiment of the present disclosure.
Figure 3:
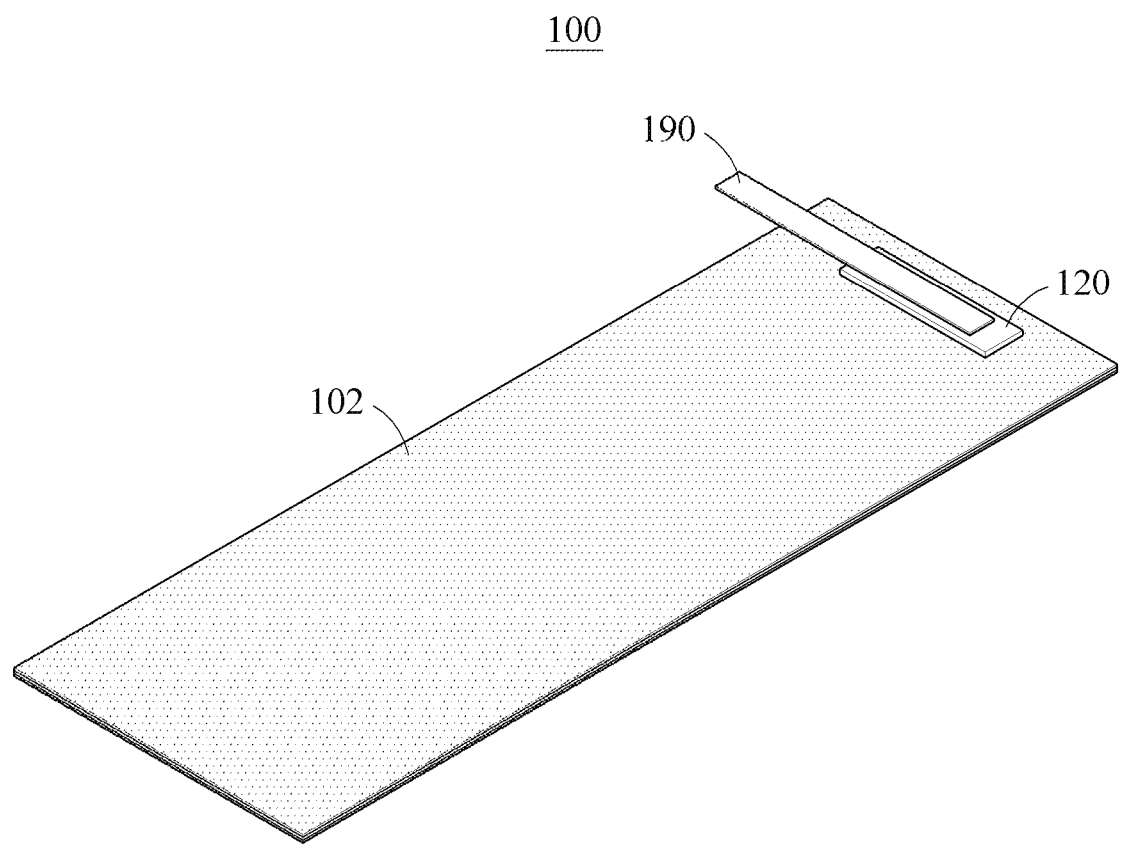
FIG. 3 is a perspective view illustrating the current collector for electrodes according to the embodiment of the present disclosure.
Figure 4A:
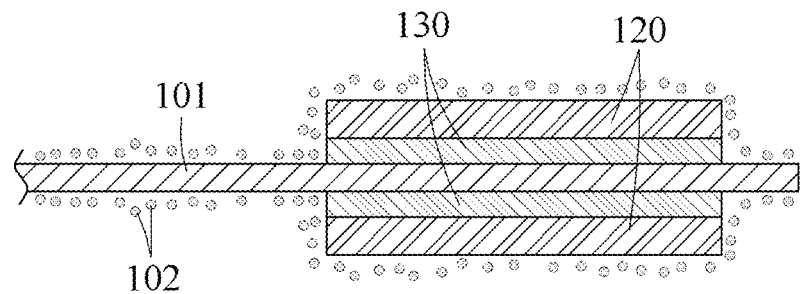
FIGS. 4A and 4B are cross-sectional views for describing a process of forming the current collector for electrodes according to the embodiment of the present disclosure.
Figure 4B:
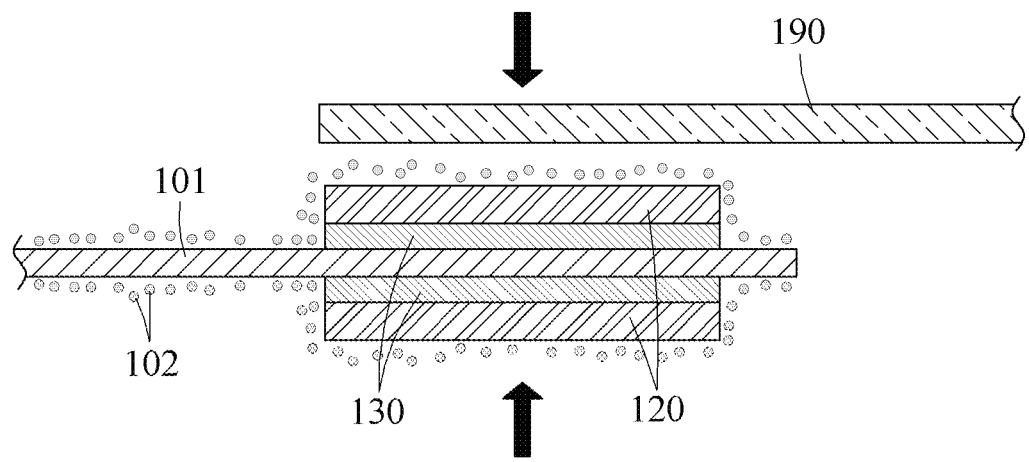
Figure 8:
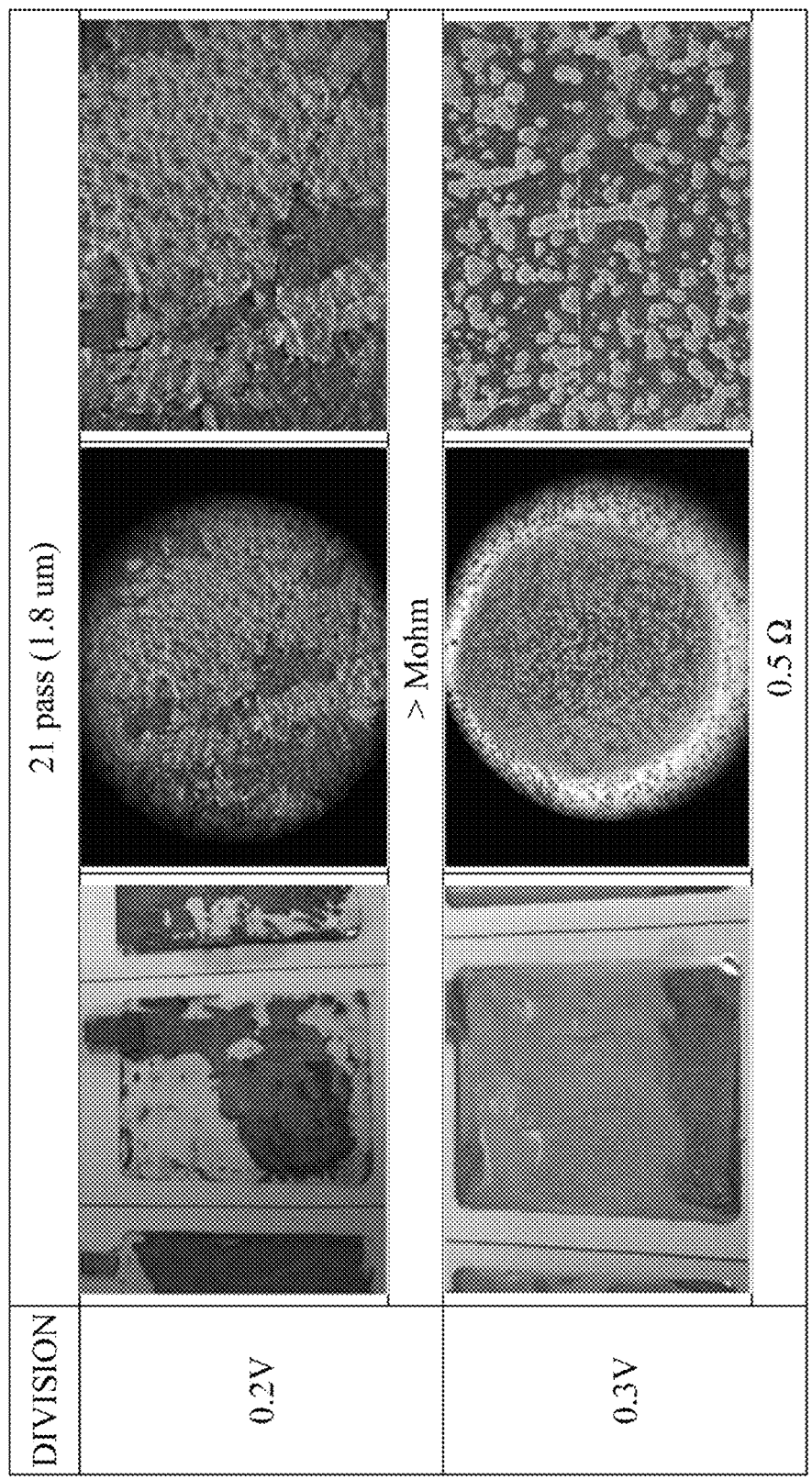
Figure 9:
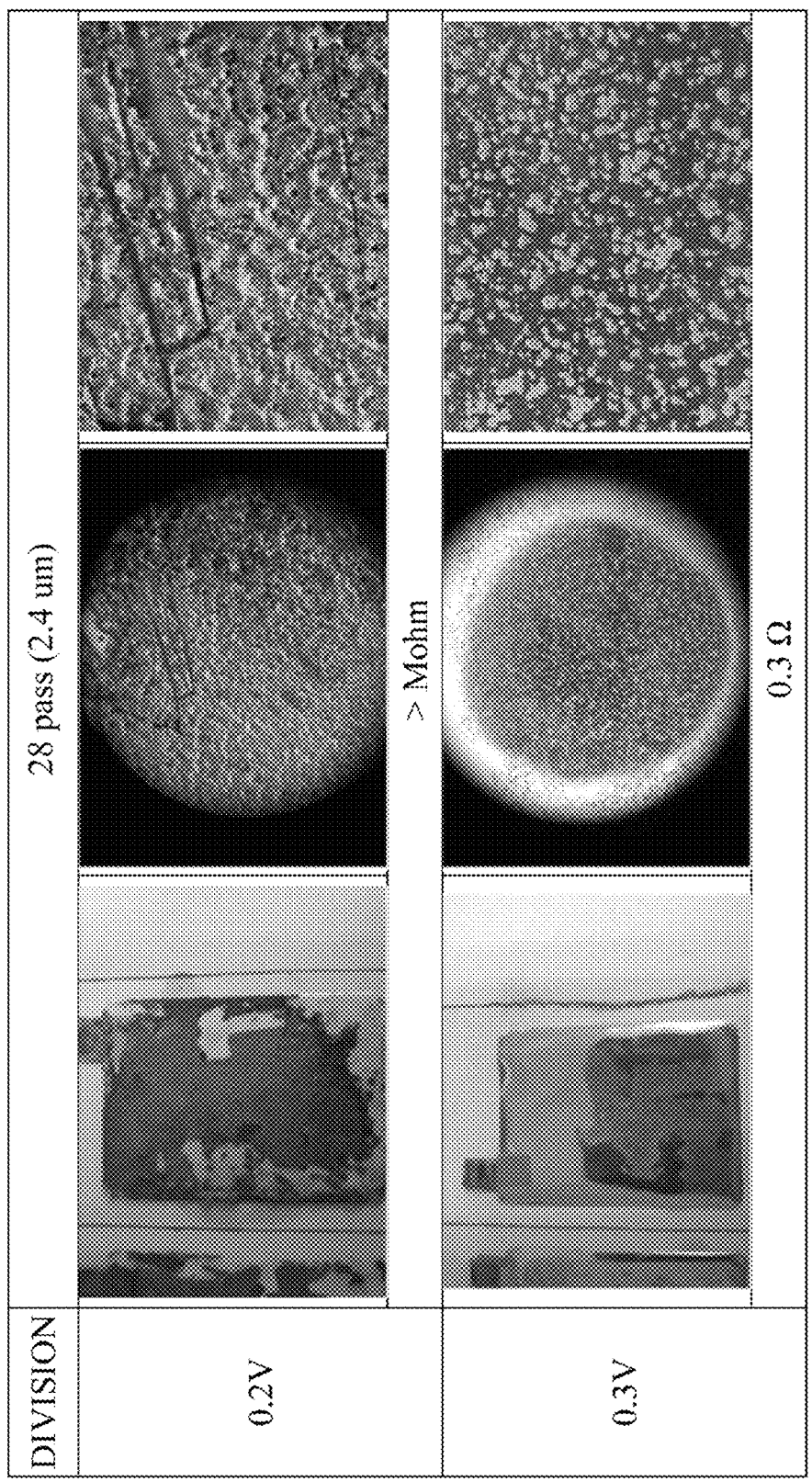
Figure 10:
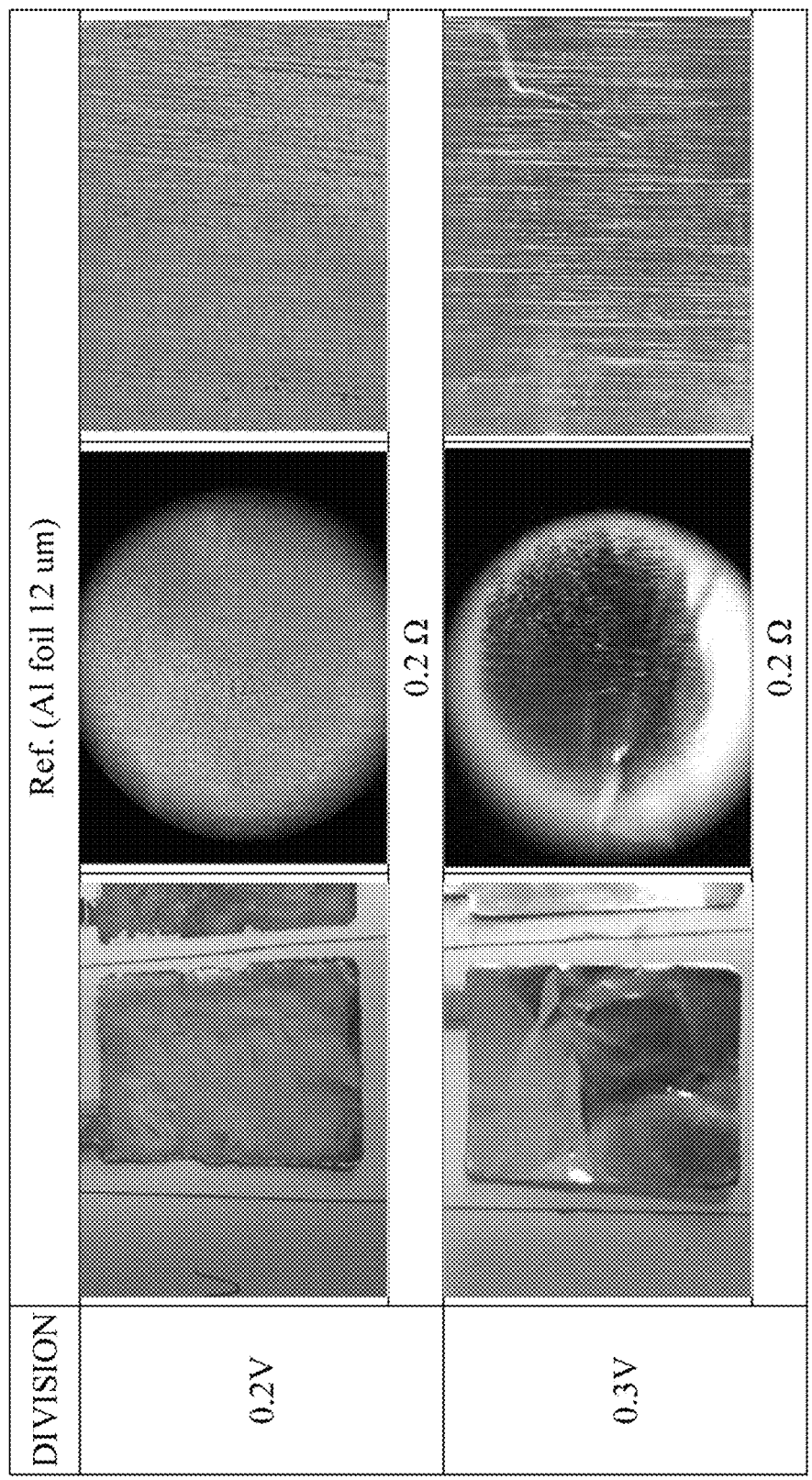
FIG. 10 is an enlarged photograph of a surface state of a metal foil when the contrast voltage is 0.2 V and 0.3 V when the Li metal of the conventional current collector for electrodes made of the metal foil is used as the anode.
Figure 14A:
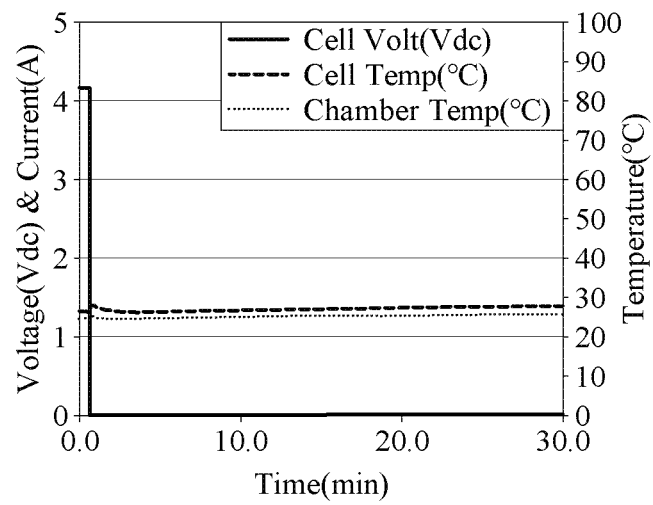
FIGS. 14A to 14C are graphs illustrating a test result comparing the changes in voltage and temperature during the external short circuit depending on the thickness of the conductive material of the current collector for electrodes according to the embodiment of the present disclosure.
Figure 14B:
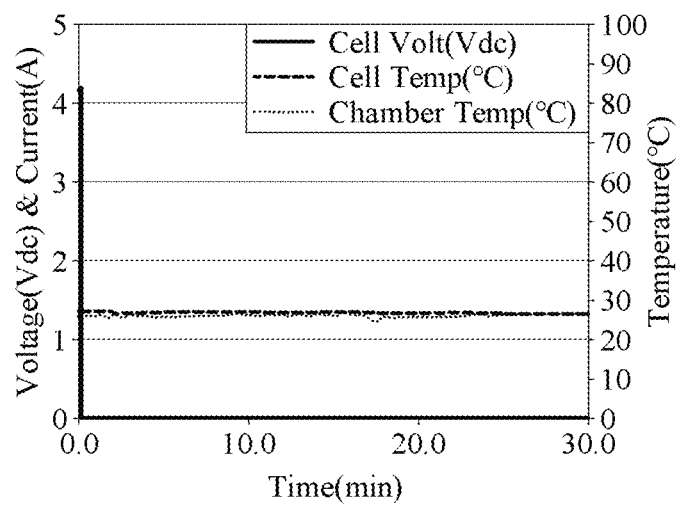
Figure 14C:
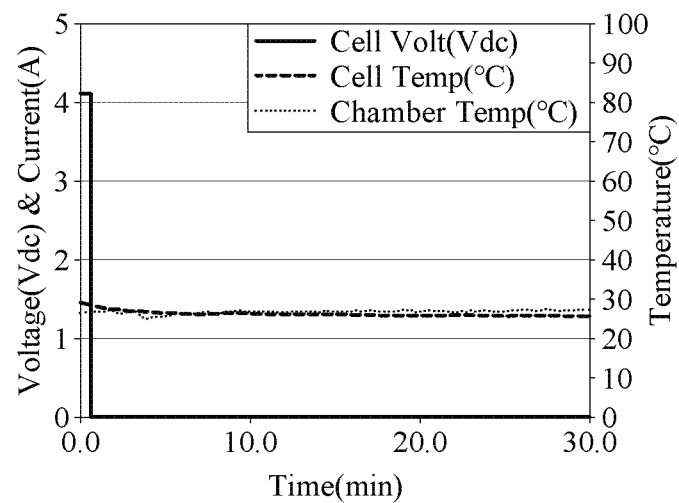

FIG. 1 is a perspective view illustrating an electrode assembly including a current collector for electrodes according to an embodiment of the present disclosure, FIG. 2 is an exploded perspective view illustrating the electrode assembly according to the embodiment of the present disclosure, FIG. 3 is a perspective view illustrating the current collector for electrodes according to the embodiment of the present disclosure, FIGS. 4A and 4B are cross-sectional views for describing a process of forming the current collector for electrodes according to the embodiment of the present disclosure, FIG. 5 is a photograph illustrating a change in a state of a conductive material during a short circuit depending on a thickness of the conductive material in the current collector for electrodes according to the embodiment of the present disclosure, FIGS. 6 to 9 are enlarged photographs of the state of the conductive material when a contrast voltage is 0.2 V and 0.3 V when Li metal is used as an anode among the states of the conductive material listed in FIG. 5, FIG. 10 is an enlarged photograph of a surface state of a metal foil when the contrast voltage is 0.2 V and 0.3 V when the Li metal of the conventional current collector for electrodes made of the metal foil is used as the anode, FIGS. 11A to 11E are graphs illustrating a test result comparing changes in voltage and temperature during an internal short circuit between a secondary battery including the current collector for electrodes according to the embodiment of the present disclosure and the conventional secondary battery, FIGS. 12A to 12E are graphs illustrating a test result comparing changes in voltage and temperature during an external short circuit between a secondary battery including the current collector for electrodes according to the embodiment of the present disclosure and the conventional secondary battery, FIGS. 13A to 13D are graphs illustrating a test result comparing the changes in voltage and temperature during the internal short circuit depending on the thickness of the conductive material of the current collector for electrodes according to the embodiment of the present disclosure, and FIGS. 14A to 14C are graphs illustrating a test result comparing the changes in voltage and temperature during the external short circuit depending on the thickness of the conductive material of the current collector for electrodes according to the embodiment of the present disclosure.

FIGS. 1 and 2 illustrate an electrode assembly 10 including a current collector 100 for electrodes according to the present disclosure. Hereinafter, a cathode means a positive electrode and an anode means a negative electrode. As illustrated in FIGS. 1 and 2, the current collector 100 for electrodes according to the present disclosure is a cathode current collector. In order to be used in the electrode assembly 10, a cathode active material 103 needs to be applied to a surface of the current collector 100 for electrodes.

On the other hand, in the current collector 200 for an anode, an anode active material 203 is applied to an anode metal foil 201, and an anode lead tab 290 may be connected to one end side in a longitudinal direction.

A separator 300 is disposed between the current collector 200 for an anode and the current collector 100 for electrodes (cathode) according to the present disclosure. When the current collector 200 for an anode and the current collector 100 for a cathode are sequentially stacked up and down with the separator 300 interposed therebetween in the state illustrated in FIG. 2, the electrode assembly 10 as illustrated in FIG. 1 is obtained.

FIG. 3 illustrates the current collector 100 for electrodes according to the embodiment of the present disclosure. The current collector 100 for electrodes does not use a metal foil, unlike the current collector 200 for an anode described above.

As illustrated in FIG. 3, since a current collector 100 for electrodes according to an embodiment of the present disclosure has a resistance value greater than a resistance of a current collector made of metal foil, a limit current value of a current flowing through the current collector may be adjusted, and since a current flow may be disturbed by damage to a polymer film, a short-circuit current may be reduced or the heat generation may be prevented when an internal short circuit of a secondary battery occurs.

A lithium secondary battery having the current collector 100 for electrodes according to the present disclosure may have a property or concept of a max current limited battery (MCLB). Hereinafter, a current collector for electrodes according to the present disclosure that may implement the MCLB will be described.

The current collector 100 for electrodes according to the embodiment of the present disclosure, which is the current collector for a cathode, has a resistance value greater than that of the current collector for a cathode of an existing battery, that is, the current collector for a cathode made of a metal foil, and thus, may not only adjust a limit current, but also collapse a current pass when an internal short circuit occurs to reduce a short-circuit current or reduce a heat generation phenomenon, thereby increasing safety of a battery.

The current collector 100 for electrodes according to the present disclosure uses a polymer film 101 as a base material without using metal foil, and is characterized in that a thin metal is applied or coated on the polymer film 101.

Referring to FIGS. 3, 4A and 4B, the current collector 100 for electrodes (current collector) according to the embodiment of the present disclosure may include: the polymer film 101; and a conductive material 102 provided on at least one of an upper surface and a lower surface of the polymer film 101.

Here, the conductive material 102 may function as an electrochemical fuse, and thus, may have a short circuit prevention function. Electrochemical properties of the conductive material 102 will be described later.

Meanwhile, at least one metal piece 120 may be provided on at least one surface of the upper surface and the lower surface of the polymer film 101. Here, the conductive material 102 may be provided on the surface of the metal piece 120 as well as the polymer film 101.

The polymer film 101 may be provided in a band shape to have a predetermined length. Here, the polymer film 101 is preferably made of an insulator material such as polyethylene (PE), polypropylene (PP), polybutylene terephthalate (PBT), polyimide (PI), or polyethylene terephthalate (PET).

The polymer film 101 preferably has a thickness of 50 μm or less, preferably 1.4 μm or more, and 50 μm or less. The current collector 100 for electrodes according to the embodiment of the present disclosure may reduce a thickness or weight of a battery than when using the existing current collector made of a metal foil. The polymer film 101 of the insulator having a thickness of 1.4 μm or more and 50 μm or less is used as a basic structure of the current collector 100, so it is possible to reduce the overall thickness or weight of the lithium secondary battery having the current collector 100 for electrodes according to the embodiment of the present disclosure.

Meanwhile, the lead tab 190 is welded to the metal piece 120 to be fixed. When the polymer film 101 does not melt at a temperature lower than a welding temperature of the lead tab 190, the lead tab 190 may not be adhered. Therefore, the polymer film 101 preferably has a melting point that may be melted in the process of welding the lead tab 190.

Referring FIGS. 3, 4A and 4B, the metal piece 120 may be provided on the surface of the polymer film 101. As illustrated in FIGS. 4A and 4B, the metal piece 120 may be provided on both surfaces of the polymer film 101 or only on any one surface thereof.

The metal piece 120 may serve to secure a position for welding the lead tab 190 on the polymer film 101. That is, the metal piece 120 may serve as a connection portion of the lead tab 190.

In addition, the metal piece 120 may serve to secure the conductivity of the current collector 100. When the length of the polymer film 101 is long, a current should flow along the polymer film 101, but when the length of the polymer film 101 is long, a separate current pass may be required. In this case, that is, when the polymer film 101 is formed long, the metal piece 120 may increase conductivity or serve as the current pass.

The metal piece 120 is preferably formed to have a thickness of 5 μm or more. Here, it is sufficient that the metal piece 120 is provided only in a portion of the polymer film 101. The number or position of metal pieces 120 formed on the polymer film 101 is not limited. However, when the lead tab 190 is welded to the metal piece 120, it is preferable to determine the position of the metal piece 120 to which the lead tab 190 is welded in consideration of the shape of the electrode assembly.

As described above, the metal piece 120 preferably has a shape of a metal thin film or a metal foil having a thickness of 5 μm or more, but is not limited thereto. That is, the metal piece 120 may be provided in the form of a thin film, a foil, or a mesh.

The metal piece 120 is preferably made of an aluminum foil or SUS 316L foil.

As described above, the metal piece 120 of the current collector 100 for electrodes according to the embodiment of the present disclosure serves as an electric pass to secure the welding position of the lead tab 190 or to secure conductivity when a length of the polymer film 101 is long.

Meanwhile, in order to attach the metal piece 120 to the surface of the polymer film 101, an adhesive layer 130 (refer to FIGS. 4A and 4B) may be formed on one surface of the metal piece 120 facing the polymer film 101.

The adhesive layer 130 is made of a material having an adhesive component such as polyvinyl acetate (PVA), polyvinyl alcohol (PVA), ethylene vinyl acetate (EVA), acrylate, and acid modified PP, and preferably has a thickness of less than 50 μm. Here, the adhesive portion 130 may be formed of a combination of two or more layers of polymer together with the above-described polymer.

In addition, the adhesive portion 130 may be a polymer layer made of a polymer material. Here, the adhesive layer 130 or the polymer layer may be provided over the entire surface of the metal piece 120 or may be provided only on a portion of the surface of the metal piece 120 to be bonded to the polymer film 101.

Meanwhile, a surface treatment including a chromate treatment may be preformed on one surface of the metal piece 120 facing the polymer film 101. The surface treatment is essential on the surface of the metal piece 120, and before attaching the metal piece 120 to the polymer film 101, chrome coating (chromate treatment) or Non-Cr treatment (non-chromate treatment or binder treatment) may be performed on the surface of the metal piece 120 or both the chrome coating (chromate treatment) or the Non-Cr treatment may be performed on the surface of the metal piece 120.

In the current collector 100 for electrodes according to the embodiment of the present disclosure, the metal piece 120 to which the EVA adhesive layer 130 is attached is put in an electrolyte at 85° C., and after 24 hours have elapsed, confirmed the adhering state between the metal piece 120 and the adhesive layer 130. The composition of the electrolyte used is LiPF6 1.1M, EC/EMC: ½ (v/v %)+Additive. As a result, it was found that the adhesive state was maintained even if the electrolyte was stored at 85° C.

The thickness of the portion where the metal piece 120 is provided in the polymer film 101 is 120 µm or less including the metal piece 120, and the thickness of the portion without the metal piece 120 or the portion without the metal piece 120 is preferably 100 µm or less.

Meanwhile, the current collector 100 for electrodes according to the embodiment of the present disclosure may include the conductive material 102 provided on the surfaces of the polymer film 101 and/or the metal piece 120.

The conductive material 102 should be made of aluminum (Al) metal. The conductive material 102 may be referred to as a conductive layer forming an outer surface of the current collector 100.

The conductive material 102 may be formed to adjust or lower a limit current or a maximum current of the current collector 100 for a cathode. In other words, the conductive material 102 is aluminum plated or coated on the surfaces of the polymer film 101 and the metal piece 120 to control the conductivity of the current collector 100, and the conductive material 102 may also be referred to as a conductive layer when focusing on the plated or coated state on the surface of the polymer film 101 and/or the metal piece 120. Hereinafter, it is revealed that the conductive material 102 is a concept including the conductive layer.

By controlling the coating amount or coating thickness of the conductive material 102 plated or coated on the surfaces of the polymer film 101 and/or the metal piece 120, it is possible to control or lower the maximum amount of current flowing through the current collector 100, thereby making it possible to increase the safety of the lithium secondary battery and secure the safety of the battery in the event of the short circuit.

In other words, the limit current or the maximum current flowing through the current collector 100 for electrodes may be controlled by the thickness or amount of the conductive material 102 formed on the surface of the polymer film 101 and/or the metal piece 120. As such, the nature or concept of the max current limited battery (MCLB) of the lithium secondary battery by the conductive material 102 of the current collector 100 for electrodes according to the embodiment of the present disclosure may be implemented.

In addition, when a physical internal short circuit or external short circuit occurs, the polymer film 101 may be melt to prevent the sudden generation of current, thereby improving the safety of the battery.

The conductive material 102 may be formed on the surface of the polymer film 101 and/or the metal piece 120 by various methods. For example, the aluminum metal, which is the conductive material 102, may be formed on the surfaces of the polymer film 101 and/or the metal piece 120 by sputtering or evaporation coating. Since the aluminum is easily oxidized, it is not easy to form the conductive material 102 on the surface of the polymer film 101 and/or the metal piece 120 by the electroplating.

Since the conductivity of the current collector 100 may be controlled or the safety of the battery may be secured by the amount (weight) or thickness of the conductive material 102 being coated, when the plating or coating is performed, it is necessary to use a method that may control or adjust the thickness or weight of the conductive material 102.

The conductive material 102 may be formed on only one surface of the polymer film 101 or formed both surfaces of the polymer film 101. At this time, the conductive material 102 is preferably formed to have a thickness of 0.5 µm based on the minimum cross section and a thickness of 2.5 µm based on the maximum cross section.

In the current collector 100 for electrodes according to the embodiment of the present disclosure, since a current may flow by the conductive material 102, the state where the conductive material 102 is coated on the surface of the polymer film 101 should be maintained well. For this purpose, it is preferable to increase the bonding strength between the conductive material 102 and the polymer film 101 by the surface treatment of the polymer film 101.

When the bonding strength between the conductive material 102 and the polymer film 101 is not good, since the conductive material 102 may be separated or detached from the surface of the polymer film 101 while an electrolyte is injected, so it is important to increase the bonding strength between the conductive material 102 and the polymer film 101.

The surface treatment for increasing the adhesion or bonding strength with the conductive material 102 may be performed on the surface of the polymer film 101.

In order to increase the bonding strength between the conductive material 102 and the polymer film 101, a corona treatment is performed on the surface of the polymer film 101.

Meanwhile, when the metal piece 120 is made of aluminum, in order to enhance the corrosion resistance of aluminum, chromate treatment of coating chromium (Cr) may be performed on aluminum, and in order to increase the adhesion of the metal piece 120, a treatment of coating epoxy-type Non-Cr may be performed on the chromate treatment. Here, the Non-Cr treatment is to coat a compound layer containing zirconium (Zr) or a compound layer containing silicon (Si). The thickness of the chromate treatment and the Non-Cr treatment is preferably several nm to several tens of nm.

Meanwhile, the current collector 100 for electrodes according to the embodiment of the present disclosure may include the lead tab 190 for connection with an external device.

The existing current collector made of a metal foil may directly weld the lead tab to the metal foil, but in the current collector 100 for electrodes according to the embodiment of the present disclosure, since the configuration corresponds to the existing metal foil is the polymer film 101, it is not possible to directly weld the lead tab to the polymer film 101. The current collector 100 for electrodes according to the embodiment of the present disclosure may solve this problem by attaching the metal piece 120 to the surface of the polymer film 101, and welding the lead tab 190 to the metal piece 120.

In the current collector 100 for electrodes according to the embodiment of the present disclosure, the lead tab 190 may be welded to the metal piece 120 by ultrasonic welding, laser welding, or spot welding.

When the lead tab 190 is welded to the metal piece 120, the polymer film 101 under the metal piece 120 is melted by the welding heat. Since the polymer film 101 is melted, the opposite metal piece 120 and the lead tab 190 may be electrically connected.

The metal piece 120 and the conductive material 102 are provided on both surfaces of the polymer film 101, and the metal pieces 120 provided on both surfaces of the polymer film 101 may be provided at the same position.

When the metal pieces 120 are positioned on both the upper and lower surfaces of the polymer film 101, it is preferably that the metal piece 120 is provided at the same or symmetrical position. After the metal piece 120 is attached to the same position on both the upper and lower surfaces of the polymer film 101 by the adhesive layer 130, the conductive material 101 may be coated on the surfaces of the polymer film 101 and the metal piece 120. At this time, the conductive material 102 may be coated on both the upper and lower surfaces of the polymer film 101, and the conductive material 102 may also be coated even on the surfaces of the metal pieces 120 provided on both the upper and lower surfaces of the polymer film 101.

Referring to FIGS. 4A and 4B, the lead tab 190 may be connected to any one metal piece 120 of the metal pieces 120 provided on both the upper and lower surfaces of the polymer film 101. The lead tab 190 may be connected to the metal piece 120 in the state where the conductive material 102 is applied or coated on the surface of the metal piece 120.

When the lead tab 190 is welded to any one metal piece 120 of the metal pieces 120 provided on both the surfaces of the polymer film 101, the polymer film 101 may be melted, and thus, the metal piece 120 provided on both the surfaces of the polymer film 101 are connected to each other, so the lead tab 190 may be electrically connected to the conductive material 102 provided on both the surfaces of the polymer film 101 at the same time.

In the state where the metal piece 120 and the conductive material 102 are provided on the upper and lower surfaces of the polymer film 101, the lead tab 190 is ultrasonic-welded, laser-welded, or spot-welded to the metal piece 120 provided on the upper surface of the polymer film 101, so the polymer film 101 may be partially melted. When the welding heat generated when welding the lead tab 190 is higher than the melting point of the polymer film 101, the polymer film 101 may be melted during the welding process.

As such, since the polymer film 101 does not exist in the melted portion of the polymer film 101, the upper and lower metal pieces 120 may directly contact each other. At this time, since the metal piece 120 is also molten by the welding heat, the upper and lower metal pieces 120 are joined together. Therefore, since the upper and lower metal pieces 120 are directly melted and bonded to each other in the portion where the polymer film 101 is not melted, the lead tab 190 welded to any one of the metal pieces 120 may be electrically connected to the conductive materials 102 formed on the upper and lower surfaces of the polymer film 101 as well as the upper and lower metal pieces 120.

The current collector 100 for electrodes according to the embodiment of the present disclosure may connect the lead tab 190 since the metal piece 120 maintains a state connected to the polymer film 101 even if a portion of the polymer film 101 is melted by the welding heat.

However, in some cases, even in the state where the polymer film 101 is not melted, the lead tab 190 may be welded to the metal piece 120.

Meanwhile, the electrical connection between the metal piece 120 and the conductive material 102 may be weakened at the portion where the lead tab 190 is welded. For example, when the conductive material 102 formed on the surface of the metal piece 120 is melted by welding heat, the electrical connection between the metal piece 120 and the conductive material 102 may deteriorate. The present disclosure may use a tab cover member (not illustrated) in order to prevent the weakening of the electrical connection between the metal piece 120 and the conductive material 102 at the portion where the lead tab 190 is welded, or enhance the electrical connection between the metal piece 120 and the conductive material 102.

The tab cover member is preferably in the form of a conductive tape covering a portion in which the lead tab 190, the metal piece 120, and the conductive material 102 are electrically connected to each other.

Among the inner and outer surfaces of the tab cover member, the outer surface not in contact with the lead tab 190, the metal piece 120, and the conductive material 102 is preferably made of a non-conductive material. The tab cover member may include a conductive material to electrically connect the metal piece 120 and the conductive material 102 or to enhance the conductivity between the metal piece 120 and the conductive material 102.

Meanwhile, the current collector 100 for electrodes according to an embodiment of the present disclosure is a current collector used as a cathode of a secondary battery, and unlike the existing current collector made of a metal foil, the safety of the secondary battery may be improved. This is because the conductive material 102 applied or coated on the polymer film 101 functions like a fuse to block the short-circuit current.

In general, when the internal short circuit or the external short circuit occurs in the secondary battery, there is a risk that the heat generation phenomenon occurs in which the temperature of the secondary battery increases due to the short-circuit current, further, the battery explodes due to the heat generation. On the other hand, even if the internal or external short circuit occurs in the secondary battery using the current collector 100 for electrodes according to the embodiment of the present disclosure by the cathode, the safety of the battery is secured by preventing the temperature of the second battery from being increased and blocking the short-circuit current.

When the short circuit occurs in the secondary battery using the current collector 100 for electrodes according to the embodiment of the present disclosure as the cathode, if the electric potential of the current collector 100 for a cathode, where the aluminum metal is applied or coated on the polymer film 101 with the conductive material 102, is lowered to near the anode potential (that is, <0.3 volt, anode Li metal), the conductive material 102 is broken as if corroded when the aluminum conductive material 102 reacts with the electrolyte, so the short-circuit current may be blocked.

The conductive material 102 applied or coated on the polymer film 101 functions as a current pass. When a short-circuit occurs, if the conductive material 102 is broken into small pieces like being corroded while reacting with the electrolyte, the current pass is blocked, so the short-circuit current no longer flows.

In the case of the current collector 100 for a cathode according to the embodiment of the present disclosure, the reason that the current pass may be blocked when the short circuit occurs is because the thickness of the aluminum conductive material 102 formed on the surface of the polymer film 101 is very thin. As a result, the conductive material 102 reacts with the electrolyte to be corroded or broken over the entire of the depth direction or the thickness direction of the conductive material 102, thereby blocking the short-circuit current pass.

The inventors of the present disclosure performed the internal short circuit and external short circuit tests on the current collector 100 for a cathode, etc. according to the results of the tests, so it was possible to find an optimal thickness range of the conductive material 102 capable of securing the safety of the battery. Hereinafter, the result of the short-circuit test and the optimal thickness range of the conductive material 102 will be described.

FIG. 5 is a photograph illustrating a change state of the conductive material 102 for each coating thickness of the aluminum conductive material 102 of the current collector 100 for electrodes and each potential of the current collector 100 for electrodes when a short circuit occurs (a potential that falls close to the anode potential when a short circuit occurs) when the current collector for electrodes is left.

Figure 6:
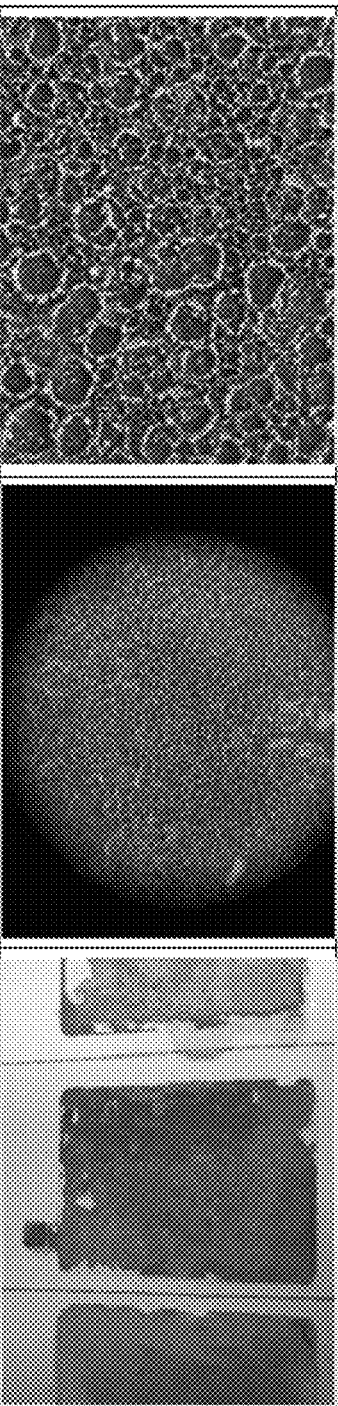
FIGS. 6 to 9 are enlarged photographs of the state of the conductive material when a contrast voltage is 0.2 V and 0.3 V when Li metal is used as an anode among the states of the conductive material listed in FIG. 5.
Figure 7:
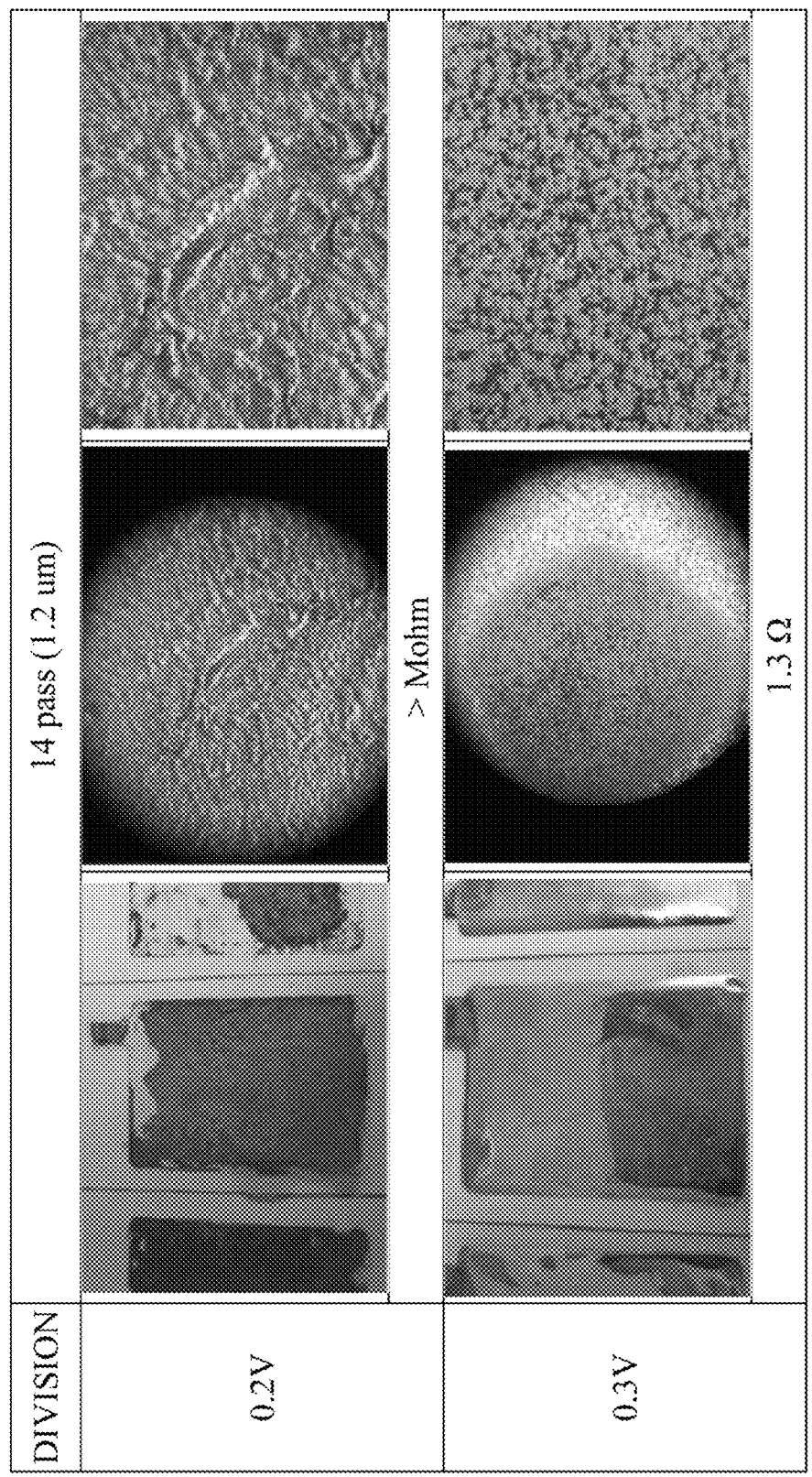

In FIG. 5, 7 Pass, 14 Pass, 21 Pass, and 28 Pass each refer to the thickness of the aluminum conductive material 102 (refer to FIGS. 6 to 9). Here, Pass means the number of times the aluminum conductive material 102 is applied or coated on the surface of the polymer film 101. In the case of 7 Pass, 14 Pass, 21 Pass, and 28 Pass, the coating thickness of the conductive material 102 is about 0.6 μm, about 1.2 μm, about 1.8 μm, and about 2.4 μm, respectively. Referring to FIG. 5, when a voltage is left at 0.2 volt, 0.3 volt, and 0.5 volt using Li metal as the anode in the current collector 100 for electrodes for each thickness, the difference in the state change of the conductive material 102 is shown. FIG. 5 is a photograph of the current collector for a cathode applied with the aluminum conductive material 102 when the secondary battery in which the current collector 100 for a cathode applied with the aluminum conductive material 102 is formed on the polymer film 101 made of PET and the current collector for an anode made of lithium metal was left at the voltage of each condition in FIG. 5 for 12 hours.

Referring to FIG. 5, it may be seen that the lower the voltage of the current collector 100 for electrodes, the more severe the cracking of the conductive material 102. That is, in the case of 0.3 volt and 0.5 volt, the shape of the conductive material 102 remains as a whole, but in the case of 0.2 volt, it may be seen that many parts without the conductive material 102 are visible.

The resistance values described below in each photograph in FIG. 5 represent resistance values measured in the current collector 100 for electrodes on which the aluminum conductive material 102 is formed. The resistance was measured by bringing the measuring terminal into contact with the surface of the current collector 100 for electrodes so that a distance between measuring terminals of a multimeter is 1 cm. It may be seen that the closer to the anode potential, the larger the resistance value, which means that the current does not flow because the resistance is large.

FIGS. 6 to 9 illustrate enlarged photographs of the state of the conductive material during the short circuit. FIG. 6 is a photograph illustrating the state in which the conductive material is corroded or broken when the voltage of the current collector 100 for electrodes on which the aluminum conductive material 102 having a thickness of about 0.6 μm is formed is 0.2 volt and 0.3 volt. It may be seen that when the voltage is 0.2 volt, the conductive material is broken like being almost completely corroded, and thus, the resistance increases sharply, whereas when the voltage is 0.3 volt, the conductive material is somewhat broken but the resistance is 1.3Ω, and thus, a current may flow. Accordingly, it may be seen that when the voltage of the current collector 100 for electrodes coated with the aluminum conductive material 102 becomes smaller than 0.3 volt, the conductive material 102 is broken like being completely corroded over the entire thickness.

FIG. 7 is a photograph illustrating the state in which the conductive material is corroded or broken when the voltage of the current collector 100 for electrodes on which the aluminum conductive material 102 having a thickness of about 1.2 μm is formed is 0.2 volt and 0.3 volt. It may be seen that when the voltage is 0.2 volt, the conductive material is broken like being almost completely corroded, and thus, the resistance increases sharply, whereas when the voltage is 0.3 volt, the conductive material is somewhat broken but the resistance is 0.8Ω, and thus, a current may flow. Accordingly, it may be seen that when the voltage of the current collector 100 for electrodes coated with the aluminum conductive material 102 becomes smaller than 0.3 volt, the conductive material 102 is broken like being completely corroded over the entire thickness.

FIG. 8 is a photograph illustrating the state in which the conductive material is corroded or broken when the voltage of the current collector 100 for electrodes on which the aluminum conductive material 102 having a thickness of about 1.8 μm is formed is 0.2 volt and 0.3 volt. It may be seen that when the voltage is 0.2 volt, the conductive material is broken like being almost completely corroded, and thus, the resistance increases sharply, whereas when the voltage is 0.3 volt, the conductive material is somewhat broken but the resistance is 0.5Ω, and thus, a current may flow. Accordingly, it may be seen that when the voltage of the current collector 100 for electrodes coated with the aluminum conductive material 102 becomes smaller than 0.3 volt, the conductive material 102 is broken like being completely corroded over the entire thickness.

FIG. 9 is a photograph illustrating the state in which the conductive material is corroded or broken when the voltage of the current collector 100 for electrodes on which the aluminum conductive material 102 having a thickness of about 2.4 μm is formed is 0.2 volt and 0.3 volt. It may be seen that when the voltage is 0.2 volt, the conductive material is broken like being almost completely corroded, and thus, the resistance increases sharply, whereas when the voltage is 0.3 volt, the conductive material is somewhat broken but the resistance is 0.3Ω, and thus, a current may flow. Accordingly, it may be seen that when the voltage of the current collector 100 for electrodes coated with the aluminum conductive material 102 becomes smaller than 0.3 volt, the conductive material 102 is broken like being completely corroded over the entire thickness.

It was confirmed that the state change of the conductive material 102 illustrated in FIGS. 6 to 9, that is, the phenomenon of breaking like being corroded along the thickness direction of the conductive material when the short circuit occurs over the entire thickness of the conductive material.

As such, when the short circuit occurs in the secondary battery using the current collector 100 for a cathode according to an embodiment of the present disclosure, the potential of the current collector for electrodes drops to the anode potential and the conductive material is corroded or broken as the conductive material reacts with the electrolyte along the thickness direction over the entire thickness, so the short-circuit current pass may be blocked.

Meanwhile, FIG. 10 is a photograph of the surface state when the short circuit occurs in the case where the potential of the current collector for a cathode made of an aluminum metal foil having a thickness of 12 μm is 0.2 volt and 0.3 volt compared to lithium metal. It may be seen that the state of the conductive material of FIG. 10 is different from the state of the conductive material of FIGS. 6 to 9. Referring to FIG. 10, it may be seen that in the case of the current collector made of the aluminum metal foil, even if the short circuit occurs, there is only slight damage to the surface of the foil, and there is no overall damage over the entire thickness of the foil, and the resistance is 0.2Ω, and therefore, the overall shape of the current collector is maintained enough to allow current to flow. Therefore, the conventional current collector for electrodes made of the aluminum metal foil does not block the short-circuit current pass when the short circuit occurs, and as a result, the internal heat generation of the battery proceeds to increase the temperature of the battery.

FIGS. 11A to 14C are experiment results showing the temperature change and the voltage change when a nail penetration test or an external short-circuit test is performed on the secondary battery using the current collector 100 for electrodes according to the embodiment of the present disclosure and the conventional current collector for electrodes made of metal foil. In this case, lithium cobalt oxide (LCO) was used as a cathode active material in manufacturing a secondary battery, and graphite was used as an anode active material.

FIGS. 11A to 11E illustrate results of a nail penetration test (nail diameter=3 mm) performed on a secondary battery (see FIGS. 11A and 11B) having the current collector 100 for electrodes coated with cathode aluminum and an current collector made of an anode copper foil according to the embodiment of the present disclosure, and a secondary battery (see FIGS. 11C and 11D) including a current collector made of a cathode aluminum foil and a current collector for electrodes coated with anode copper coating, and a secondary battery (see FIG. 11E) including a current collector made of a cathode aluminum foil and a current collector made of an anode copper foil. Here, the current collector for electrodes coated with anode copper is a current collector for electrodes in which copper is coated on a polymer film with a conductive material, and refers to a current collector used as an anode.

Figure 11A:
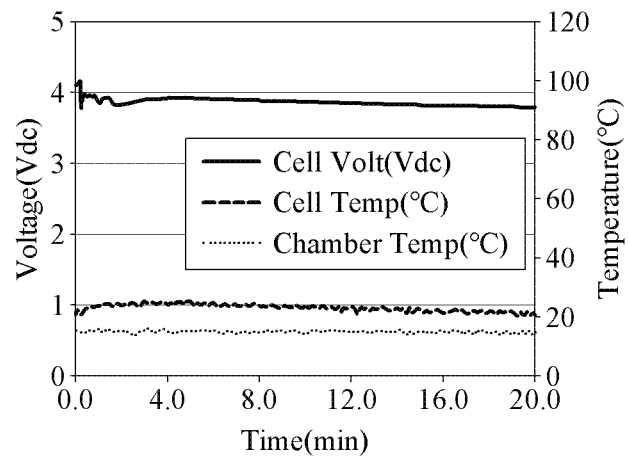
FIGS. 11A to 11E are graphs illustrating a test result comparing changes in voltage and temperature during an internal short circuit between a secondary battery including the current collector for electrodes according to the embodiment of the present disclosure and the conventional secondary battery.
Figure 11B:
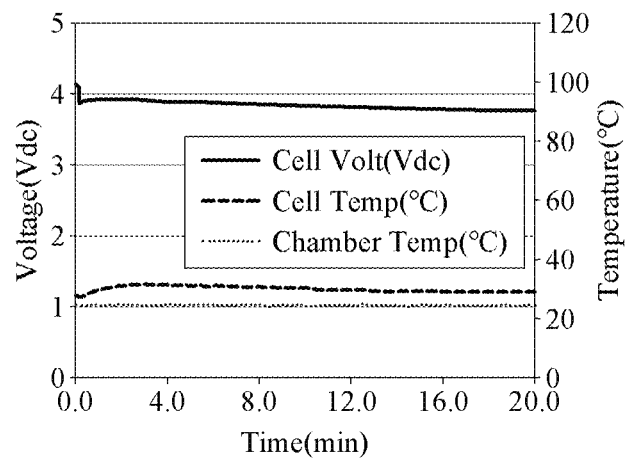
Figure 11C:
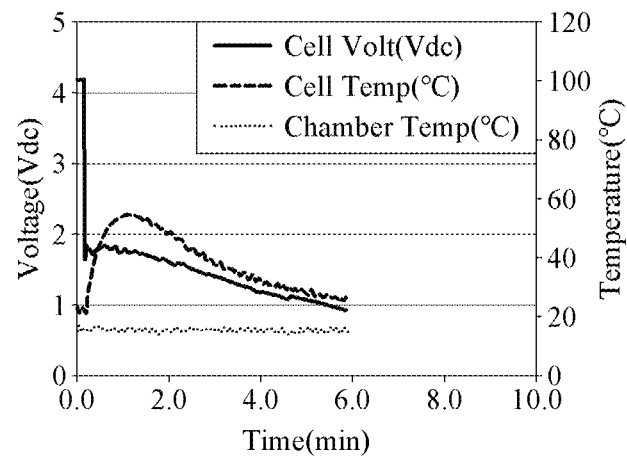
Figure 11D:
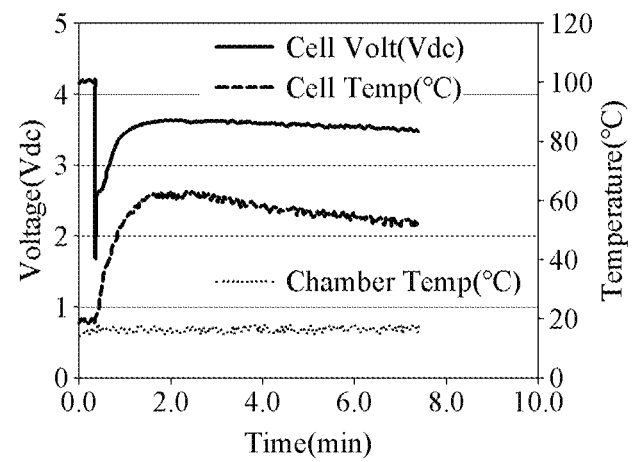
Figure 11E:
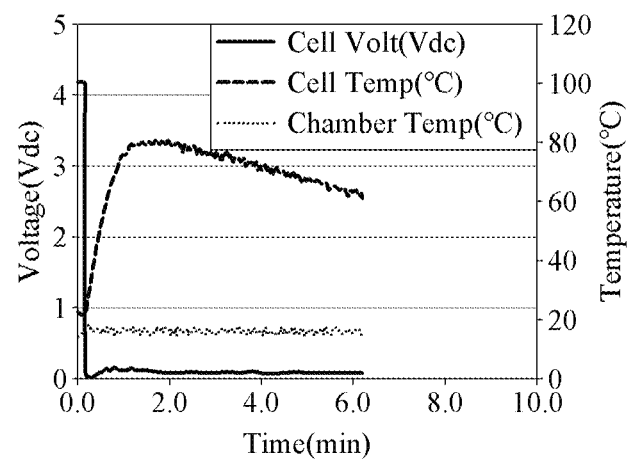

Referring to FIGS. 11A to 11E, it may be seen that the voltage and temperature of FIGS. 11A and 11B are smaller than the voltage and temperature of FIGS. 11C and 11D and the voltage and temperature of FIG. 11E. In the case of FIGS. 11A and 11B, the maximum temperature is about 26.2° C. and 32.2° C., respectively, whereas in the case of FIGS. 11C and 11D, the maximum temperature is about 54.7° C. and 63.1° C., respectively, and in the case of FIG. 11E, the maximum temperature is about 81.3° C. Therefore, it may be seen that the safety of the battery using the current collector 100 for electrodes coated with an aluminum conductive material according to the embodiment of the present disclosure as the current collector for a cathode when the internal short circuit occurs is excellent.

Figure 12A:
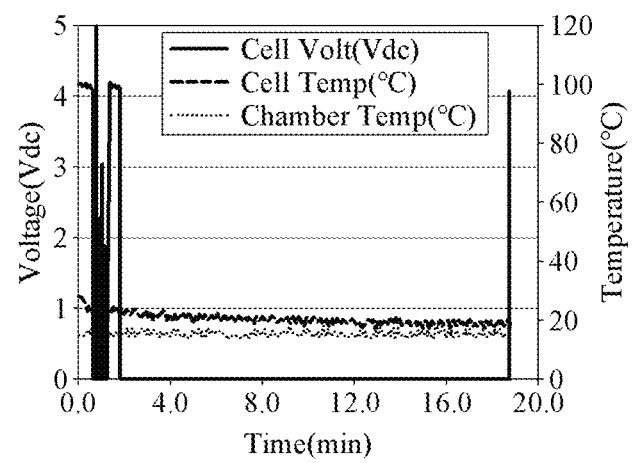
FIGS. 12A to 12E are graphs illustrating a test result comparing changes in voltage and temperature during an external short circuit between a secondary battery including the current collector for electrodes according to the embodiment of the present disclosure and the conventional secondary battery.
Figure 12B:
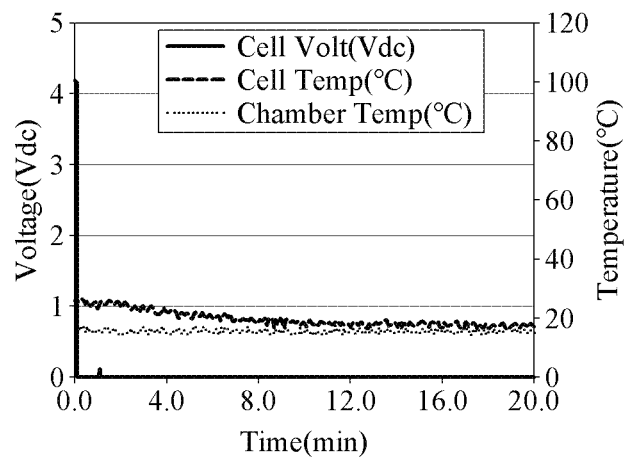
Figure 12C:
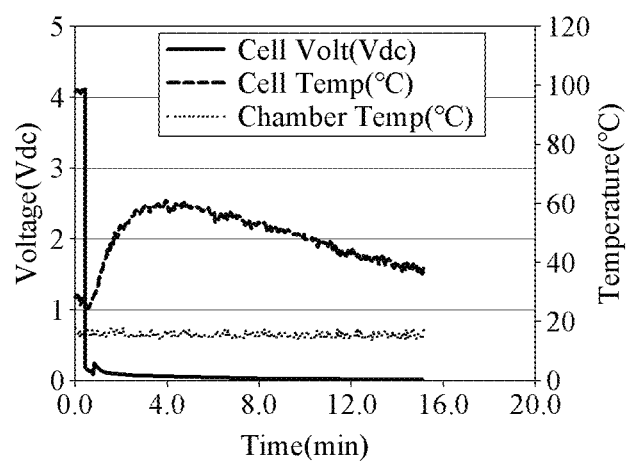
Figure 12D:
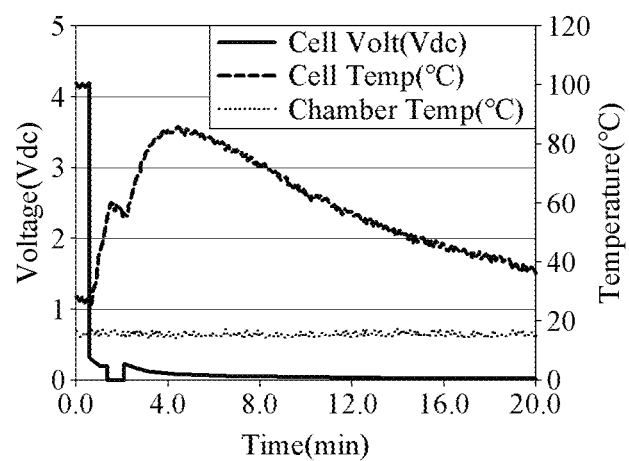
Figure 12E:
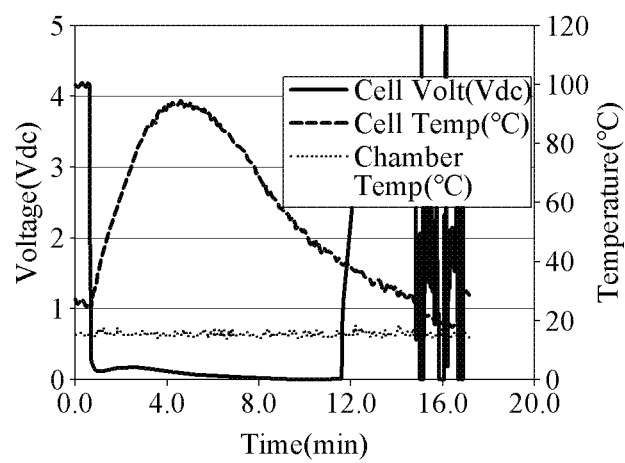
Figure 13A:
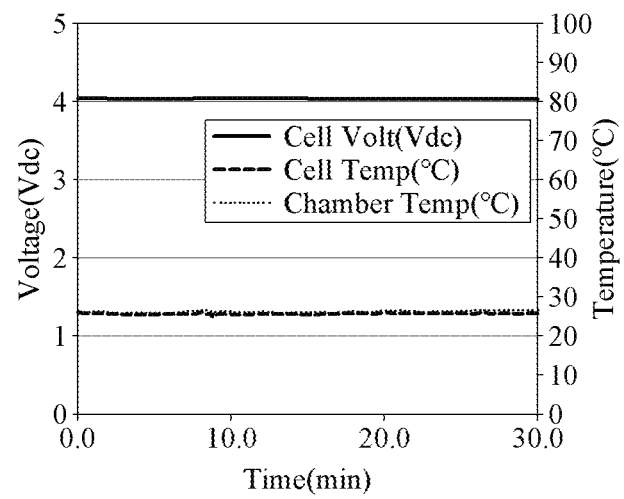
FIGS. 13A to 13D are graphs illustrating a test result comparing the changes in voltage and temperature during the internal short circuit depending on the thickness of the conductive material of the current collector for electrodes according to the embodiment of the present disclosure.
Figure 13B:
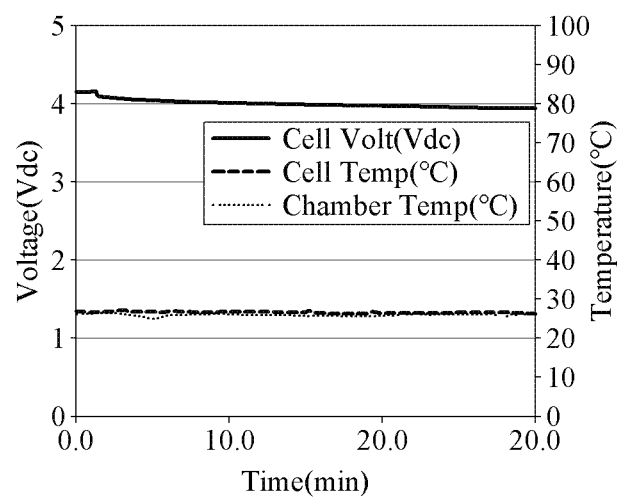
Figure 13C:
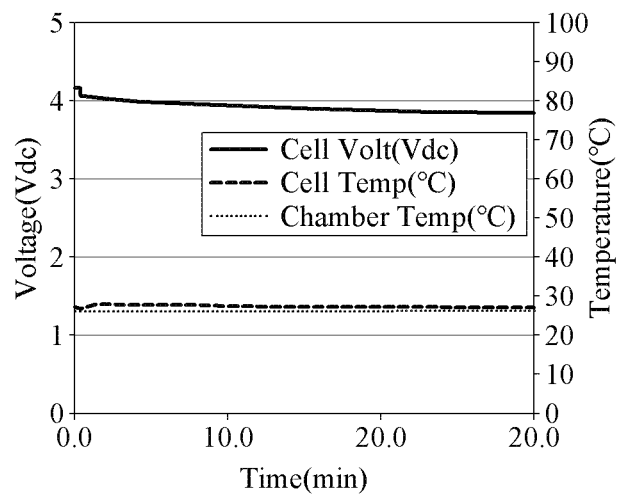
Figure 13D:
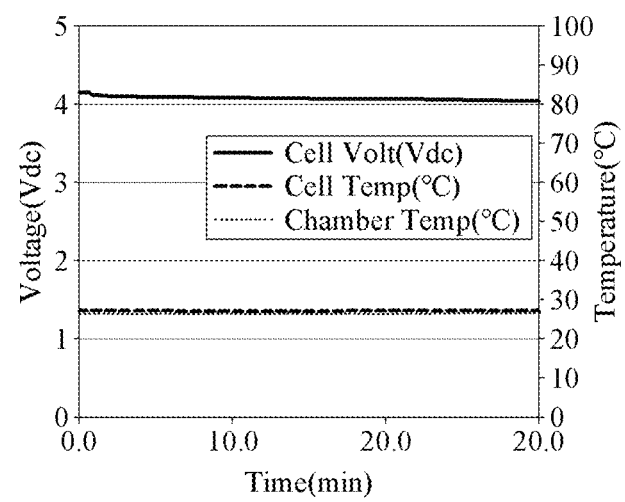

FIGS. 12A to 12E illustrate results of an external short-circuit test performed on a secondary battery (see FIGS. 12A and 12B) having the current collector 100 for electrodes coated with cathode aluminum and an current collector made of an anode copper foil according to the embodiment of the present disclosure, and a secondary battery (see FIGS. 12C and 12D) including a current collector made of a cathode aluminum foil and a current collector for electrodes coated with anode copper coating, and a secondary battery (see FIG. 12E) including a current collector made of a cathode aluminum foil and a current collector made of an anode copper foil. It may be seen that similar to the result of FIGS. 11A to 11E, the voltage and temperature of FIGS. 12A and 12B are smaller than the voltage and temperature of FIGS. 12C and 12D. In the case of FIGS. 12A and 12B, the maximum temperature is about 27.9° C. and 26.6° C., respectively, whereas in the case of FIGS. 12C and 12D, the maximum temperature is about 60.9° C. and 86.2° C., respectively, and in the case of FIG. 12E, the maximum temperature is about 94.8° C. Therefore, it may be seen that the safety of the battery using the current collector 100 for electrodes coated with an aluminum conductive material according to the embodiment of the present disclosure as the current collector for a cathode when the external short circuit occurs is excellent.

FIGS. 13A to 13D are the results of the nail penetration test according to an application amount (coating thickness) of a conductive material in the current collector 100 for electrodes according to an embodiment of the present disclosure. FIGS. 13A, 13B, 13C, and 13D are results of the nail penetration test when the application amount (coating thickness) of conductive material is about 0.6 μm, 1.2 μm, 1.8 μm, and 2.4 μm, respectively. Referring to FIGS. 13A to 13D, since the maximum temperatures are about 26.48° C., 27.52° C., 28.29° C., and 27.81° C., respectively, it may be confirmed that the battery does not generate much heat even if the internal short circuit occurs.

FIGS. 14A to 14C are the results of the external short-circuit test according to an application amount (coating thickness) of a conductive material in the current collector 100 for electrodes according to an embodiment of the present disclosure. FIGS. 14A, 14B, and 14C are results of external short-circuit tests when the application amount (coating thickness) of conductive material is about 1.2 μm, 1.8 μm, and 2.4 μm, respectively. Referring to FIGS. 14A to 14C, since the maximum temperatures are about 28.17° C., 27.28° C., and 29.00° C., respectively, it may be confirmed that the battery does not generate much heat even if the external short circuit occurs and the battery is safe.

Meanwhile, FIGS. 15A to 15D are enlarged photographs of surfaces of a current collector for electrodes made of an aluminum foil and the current collector for electrodes according to the embodiment of the present disclosure in which an aluminum conductive material is applied to a surface of a polymer film.

Figure 15A:
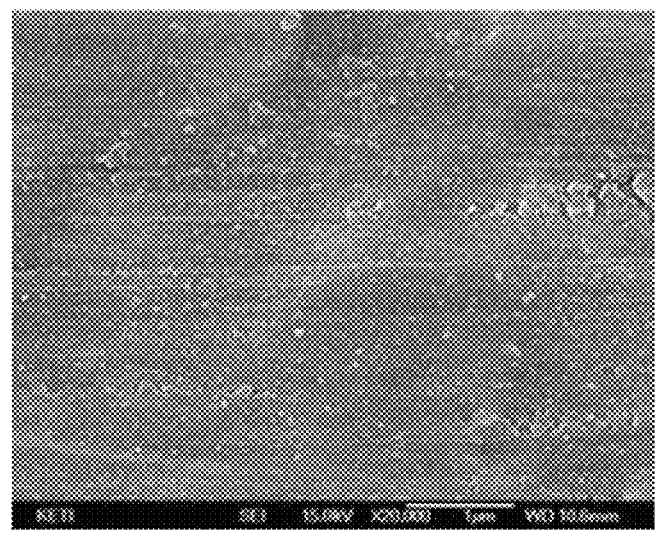
FIGS. 15A to 15D are enlarged photographs of surfaces of a current collector made of an aluminum foil and the current collector for electrodes according to the embodiment of the present disclosure in which an aluminum conductive material is applied to a surface of a polymer film.
Figure 15B:
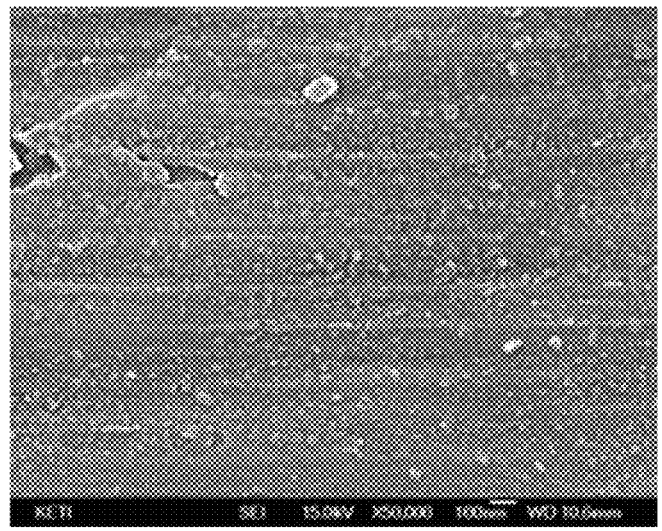
Figure 15C:
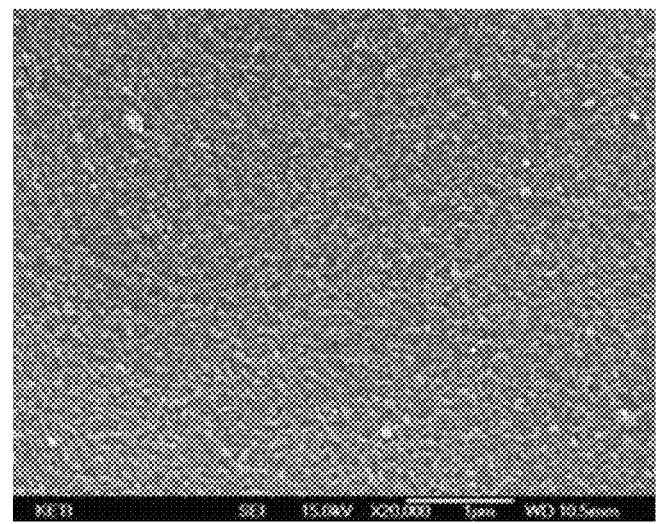
Figure 15D:
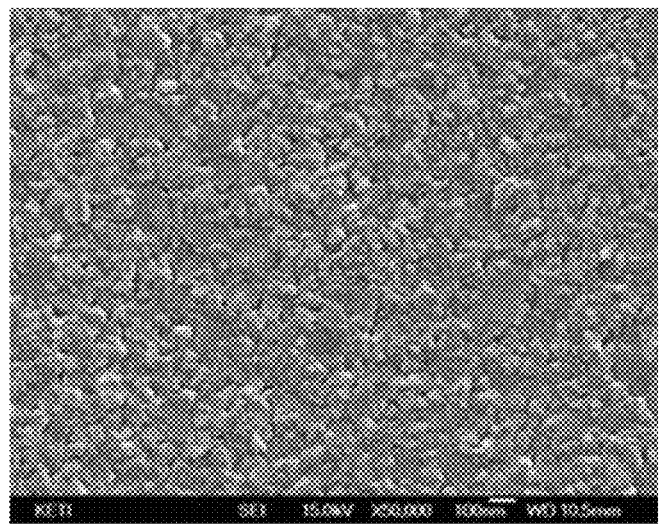

FIGS. 15A and 15B each are scanning electron micrograph (SEM) photographs taken at 20,000 times and 50,000 times magnification of the surface of the current collector for electrodes made of an aluminum foil, and FIGS. 15C and 15D each are SEM photographs taken at 20,000 times and 50,000 times magnification of the surface of the current collector for electrodes according to the present disclosure in which an aluminum conductive material is applied to the surface of a polymer film.

In the case of FIGS. 15A and 15B, the surface has a relatively smooth shape without irregular shapes such as cracks or pores. On the other hand, in the case of FIGS. 15C and 15D, the surface has irregular shapes such as cracks or has a plurality of pores. It may be seen that the shapes of the surface illustrated in FIGS. 15A and 15B and the surface illustrated in FIGS. 15C and 15D are significantly different.

The aluminum conductive material 102 is applied or coated on the current collector 100 for electrodes according to the embodiment of the present disclosure by the sputtering or evaporation manner. A plurality of nano-sized pores may be formed on the surface of the aluminum conductive material 102 formed in this way or irregular shapes such as cracks (hereinafter referred to as "pores") may present on the surface of the aluminum conductive material 102 formed in this way. This is because fine particles of aluminum are not be sputtered or deposited on the polymer film 101 in 100% close contact with no gaps, there are minute gaps between the aluminum particles. Accordingly, these gaps become pores. On the other hand, in the case of the existing current collector for electrodes made of a metal foil, there are no pores at all because the metal foil is a rolled foil.

Here, in the case of the current collector 100 for electrodes according to the embodiment of the present disclosure, the electrolyte permeates into a plurality of pores present in the aluminum conductive material 102, and the electrolyte may present in pores over the entire or partial thickness of the conductive material 102. When the short circuit occurs in such a state, since the area in which the electrolyte present in the pores of the conductive material 102 and the conductive material 102 react with each other is widened, the conductive material 102 may be easily corroded or broken in the thickness direction, so the short-circuit current may not flow. In this way, the plurality of pores existing in the conductive material 102 serve as a fuse, so that the flow of the short-circuit current may be blocked when the short circuit occurs.

As described above, in the current collector 100 for a cathode according to the embodiment of the present disclosure, the conductive material 102 is formed on the surface of the polymer film 101 with a thickness of 0.5 μm based on the minimum cross section and 2.5 μm based on the maximum cross section, so the energy density of the secondary battery using the current collector 100 for electrodes as the cathode may increase, the safety of the battery may increase, and the safety of the battery may be secured when the short circuit occurs.

Hereinabove, although the embodiments of the present disclosure has been described by specific matters such as detailed components, specific matters, limited embodiments, and the accompanying drawings, they have been provided only for assisting in the entire understanding of the present disclosure. Therefore, the present disclosure is not limited to the exemplary embodiments. Various modifications and changes may be made by those skilled in the art to which the present disclosure pertains from this description. Therefore, the spirit of the present disclosure should not be limited to these exemplary embodiments, but the claims and all of modifications equal or equivalent to the claims are intended to fall within the scope and spirit of the present disclosure.

The invention claimed is:

1. A current collector for electrodes, comprising:
a polymer film; and
a conductive material provided on at least one surface of upper and lower surfaces of the polymer film,
wherein the conductive material has a function of an electrochemical fuse or a function of blocking a short-circuit current;
wherein the conductive material is made of aluminum and is coated or applied at a thickness of 0.6 μm to 2.4 μm; and
wherein at least one metal piece is provided on the at least one surface of the upper and lower surfaces of the polymer film, and the conductive material is provided on a surface of the at least one metal piece.

2. A current collector for electrodes, comprising:
a polymer film; and
a conductive material provided on at least one surface of upper and lower surfaces of the polymer film,
wherein when a short circuit occurs, the conductive material reacts with an electrolyte to be corroded or broken along a thickness direction over an entire thickness of the conductive material;
wherein the conductive material is made of aluminum and is coated or applied at a thickness of 0.6 μm to 2.4 μm; and
wherein at least one metal piece is provided on the at least one surface of the upper and lower surfaces of the polymer film, and the conductive material is provided on a surface of the at least one metal piece.

3. A current collector for electrodes, comprising:
a polymer film; and
a conductive material provided on at least one surface of upper and lower surfaces of the polymer film,
wherein when a short circuit occurs, a potential drops to an anode potential and the conductive material is corroded or broken along a thickness direction over an entire thickness of the conductive material;
wherein the conductive material is made of aluminum and is coated or applied at a thickness of 0.6 μm to 2.4 μm; and
wherein at least one metal piece is provided on the at least one surface of the upper and lower surfaces of the polymer film, and the conductive material is provided on a surface of the at least one metal piece.

4. The current collector for electrodes of claim 1, wherein the metal piece is made of an aluminum foil or SUS 316L foil.

5. The current collector for electrodes of claim 4, further comprising:
a lead tab joined or connected to the at least one metal piece.

6. The current collector for electrodes of claim 1, wherein a current flow is blocked by a plurality of pores present in the conductive material when a short circuit occurs.

7. The current collector for electrodes of claim 1, wherein a plurality of nano-sized pores is formed in the conductive material coated or applied to a surface of the polymer film, and
when an internal short circuit or an external short circuit occurs, the conductive material is corroded or broken over the thickness direction while a reaction area between an electrolyte and the conductive material present in the plurality of pores is widened to block a flow of a short-circuit current.

8. The current collector for electrodes of claim 1, wherein the current collector for electrodes is for a cathode.

9. The current collector for electrodes of claim 2, wherein a current flow is blocked by a plurality of pores present in the conductive material when a short circuit occurs.

10. The current collector for electrodes of claim 2, wherein a plurality of nano-sized pores is formed in the conductive material coated or applied to a surface of the polymer film, and
when an internal short circuit or an external short circuit occurs, the conductive material is corroded or broken over the thickness direction while a reaction area between an electrolyte and the conductive material present in the plurality of pores is widened to block a flow of a short-circuit current.

11. The current collector for electrodes of claim 2, wherein the current collector for electrodes is for a cathode.

12. The current collector for electrodes of claim 3, wherein a current flow is blocked by a plurality of pores present in the conductive material when a short circuit occurs.

13. The current collector for electrodes of claim 3, wherein a plurality of nano-sized pores is formed in the conductive material coated or applied to a surface of the polymer film, and when an internal short circuit or an external short circuit occurs, the conductive material is corroded or broken over the thickness direction while a reaction area between an electrolyte and the conductive material present in the plurality of pores is widened to block a flow of a short-circuit current.

14. The current collector for electrodes of claim 3, wherein the current collector for electrodes is for a cathode.

* * * * *